United States Patent
Verma

(10) Patent No.: US 12,034,797 B2
(45) Date of Patent: Jul. 9, 2024

(54) DISTRIBUTED BACKUP OF UNSHIPPED CHARGING DATA RECORDS

(71) Applicant: Microsoft Technology Licensing, LLC, Redmond, WA (US)

(72) Inventor: Devesh Verma, Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/321,637

(22) Filed: May 22, 2023

(65) Prior Publication Data

US 2023/0291792 A1 Sep. 14, 2023

Related U.S. Application Data

(63) Continuation of application No. 17/497,226, filed on Oct. 8, 2021, now Pat. No. 11,665,225.

(51) Int. Cl.
*H04L 67/1001* (2022.01)
*G06F 11/14* (2006.01)
*H04L 43/0864* (2022.01)

(52) U.S. Cl.
CPC ...... *H04L 67/1001* (2022.05); *G06F 11/1464* (2013.01); *H04L 43/0864* (2013.01); *G06F 2201/84* (2013.01)

(58) Field of Classification Search
None
See application file for complete search history.

(56) References Cited

U.S. PATENT DOCUMENTS

2012/0289189 A1* 11/2012 Kotalwar ............ H04M 15/74
455/406

* cited by examiner

*Primary Examiner* — Tonia L Dollinger
*Assistant Examiner* — Ishrat Rashid
(74) *Attorney, Agent, or Firm* — Ray, Quinney & Nebeker; James S. Bullough

(57) ABSTRACT

A first charging data record (CDR) generating node can receive charging server information and available CDR storage information from a second CDR generating node. The first CDR generating node can detect that the charging server is unavailable to receive CDRs from the first CDR generating node. The first CDR generating node can also determine that a CDR storage area corresponding to the first CDR generating node should not be used to store additional CDRs. The first CDR generating node can also select the second CDR generating node for storing the additional CDRs that are generated by the first CDR generating node. The second CDR generating node can be selected based at least in part on the charging server information and the available CDR storage information. The first CDR generating node can cause at least one CDR to be sent to the second CDR generating node.

20 Claims, 11 Drawing Sheets

DISTRIBUTED BACKUP OF UNSHIPPED CHARGING DATA RECORDS

CROSS-REFERENCE TO RELATED APPLICATIONS

This application is a Continuation of U.S. application Ser. No. 17/497,226, filed on Oct. 8, 2021, the entirety of which is incorporated herein by reference.

BACKGROUND

A cellular network can provide mobile devices with access to services available from one or more external packet data networks. A cellular network is distributed over geographical areas that are typically referred to as "cells." Each cell can be served by at least one base station. One or more base stations provide a cell with network coverage. When joined together, these cells can provide network coverage over a wide geographic area.

Cellular networks have undergone significant changes over the past several decades. The first two generations of cellular networks supported voice and then text messaging. Third generation (3G) networks initiated the transition to broadband access, supporting data rates typically measured in hundreds of kilobits-per-second. Fourth generation (4G) networks supported data rates that were significantly faster, typically measured in megabits-per-second. Today, the industry is transitioning from 4G to fifth generation (5G) networks, with the promise of significant increases in data rates.

In a cellular network, a chargeable event can be any activity utilizing network resources and related services for which the network operator may want to charge money. Some examples of chargeable events can include user-to-user communication (e.g., a single call, a data communication session, a short message), user-to-network communication (e.g., service profile administration), inter-network communication (e.g., transferring calls, signaling, short messages, interconnection), mobility (e.g., roaming, inter-system handover), and user-to-application/service communication.

A charging data record (CDR) is a collection of information about one or more chargeable events. CDRs can be generated and used by various nodes in a cellular network to assist with performing various activities related to chargeable events. For example, CDRs can be transferred to the network operator's billing domain for the purpose of subscriber billing and/or inter-operator accounting (or additional functions, such as statistics, at the operator's discretion).

A network node that generates CDRs may be referred to herein as a CDR generating node. There are many different types of network nodes that can function as CDR generating nodes. CDRs can be sent from CDR generating nodes to a charging server. An example of a charging server is a gateway function (CGF), which is a mediation and storage agent for the CDRs. A CGF can be configured to receive CDRs from a plurality of different CDR generating nodes.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

In accordance with one aspect of the present disclosure, a method is disclosed for distributed backup of unshipped charging data records. The method is performed by a first charging data record (CDR) generating node. The method includes receiving charging server information and available CDR storage information from a second CDR generating node. The charging server information indicates that the second CDR generating node is communicatively coupled to a charging server to which the first CDR generating node is also communicatively coupled. The available CDR storage information indicates that the second CDR generating node has storage space available. The method further includes detecting that the charging server is unavailable to receive CDRs from the first CDR generating node. The method further includes determining that a CDR storage area corresponding to the first CDR generating node should not be used to store additional CDRs. The method further includes selecting the second CDR generating node for storing the additional CDRs that are generated by the first CDR generating node while the charging server is unavailable and while the CDR storage area corresponding to the first CDR generating node should not be used to store the additional CDRs. The second CDR generating node is selected based at least in part on the charging server information and the available CDR storage information that the first CDR generating node received from the second CDR generating node. The method further includes causing at least one CDR to be sent to the second CDR generating node.

Determining that the CDR storage area should not be used to store the additional CDRs may include determining that a usage level of the CDR storage area is greater than or equal to a saturation level of the CDR storage area.

The method may further include receiving an acknowledgement message from the second CDR generating node. The acknowledgement message may indicate that the second CDR generating node will send the at least one CDR to the charging server when the charging server becomes available again.

The method may further include selecting the second CDR generating node from among a plurality of CDR generating nodes.

The method may further include receiving the charging server information and the available CDR storage information from the plurality of CDR generating nodes.

The method may further include selecting the second CDR generating node is based at least in part on the charging server information and the available CDR storage information received from the plurality of CDR generating nodes and round-trip time associated with the plurality of CDR generating nodes.

Selecting the second CDR generating node may include excluding from consideration any of the plurality of CDR generating nodes that are not communicatively coupled to the charging server.

Selecting the second CDR generating node may include excluding from consideration any of the plurality of CDR generating nodes that do not have at least a threshold amount of available storage space.

Selecting the second CDR generating node may include creating a set of candidate CDR generating nodes, removing from the set of candidate CDR generating nodes any of the plurality of CDR generating nodes that are not communicatively coupled to the charging server or that do not have at least a threshold amount of available storage space, selecting a CDR generating node that remains in the set of candidate CDR generating nodes and that has a shortest round-trip time, and selecting the CDR generating node with a higher amount of free disk space when at least two CDR generating nodes remain in the set of candidate CDR generating nodes and have the shortest round-trip time.

The charging server information and the available CDR storage information may be included in a private extension information element in an echo request message.

In accordance with another aspect of the present disclosure, a method is disclosed for distributed backup of unshipped charging data records. The method includes causing charging server information and available charging data record (CDR) storage information to be sent to a first CDR generating node. The charging server information indicates that a second CDR generating node is communicatively coupled to a same charging server as the first CDR generating node. The available CDR storage information indicates that the second CDR generating node has storage space available. The method further includes receiving at least one CDR at the second CDR generating node. The at least one CDR is generated by the first CDR generating node while the charging server is unavailable and while a CDR storage area corresponding to the first CDR generating node should not be used to store additional CDRs. The method further includes storing the at least one CDR at the second CDR generating node. The method further includes detecting that the charging server has become available to receive CDRs. The method further includes causing the at least one CDR to be sent to the charging server in response to detecting that the charging server has become available.

The method may further include causing an acknowledgement message to be sent to the first CDR generating node. The acknowledgement message may indicate that the second CDR generating node will send the at least one CDR to the charging server when the charging server becomes available again.

The charging server information and the available CDR storage information may be included in a private extension information element in an echo request message.

In accordance with another aspect of the present disclosure, a system is disclosed for distributed backup of unshipped charging data records. The system includes at least one processor. The system also includes at least one memory storing computer-executable instructions that, when executed by the at least one processor, cause the at least one processor to detect that a charging server is unavailable to receive charging data records from a first charging data record (CDR) generating node. The instructions, when executed by the at least one processor, also cause the at least one processor to determine that a usage level of a CDR storage area corresponding to the first CDR generating node is greater than or equal to a saturation level of the CDR storage area. The instructions, when executed by the at least one processor, also cause the at least one processor to select a backup node for storing additional CDRs that are generated by the first CDR generating node while the charging server is unavailable and while the usage level of the CDR storage area is greater than or equal to the saturation level of the CDR storage area. The instructions, when executed by the at least one processor, also cause the at least one processor to cause at least one CDR to be sent to the backup node.

The backup node may include a second CDR generating node that is communicatively coupled to the charging server.

The system may include additional computer-executable instructions that, when executed by the at least one processor, cause the at least one processor to receive charging server information and available CDR storage information from the second CDR generating node. The charging server information may indicate that the second CDR generating node is communicatively coupled to the charging server. The available CDR storage information may indicate that the second CDR generating node has storage space available.

The charging server information and the available CDR storage information may be included in a private extension information element in an echo request message.

The system may further include additional computer-executable instructions that, when executed by the at least one processor, cause the at least one processor to select the backup node from among a plurality of CDR generating nodes.

The backup node may include a georedundant instance of the first CDR generating node.

The system may further include additional computer-executable instructions that, when executed by the at least one processor, cause the at least one processor to receive the at least one CDR from the georedundant instance of the first CDR generating node in response to detecting that the charging server has become available again. The instructions, when executed by the at least one processor, may also cause the at least one processor to send the at least one CDR to the charging server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1A:
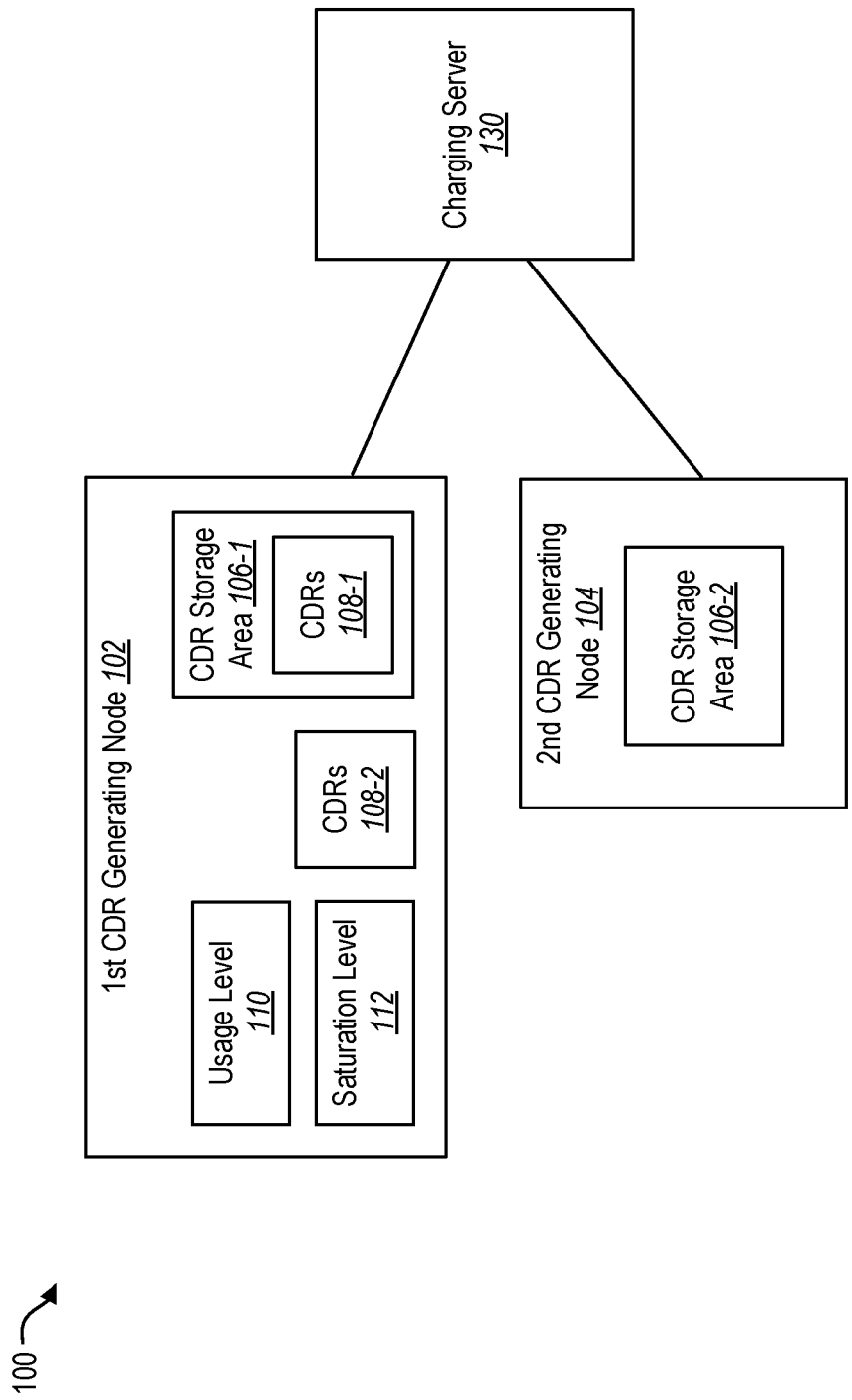
FIGS. 1A-C illustrate an example of a system for distributed backup of unshipped charging data records in accordance with an embodiment of the present disclosure.

The present disclosure is generally related to an environment in which CDR generating nodes send CDRs to charging servers. In such an environment, a charging server could experience a failure and become at least temporarily unavailable. When a charging server is unavailable, a CDR generating node cannot send CDRs to the charging server. CDRs that have been generated by a CDR generating node but not yet sent to a charging server may be referred to herein as unshipped (or unsent) CDRs.

CDRs are important, and their loss can lead to a loss of revenue for network operators. Therefore, when a charging server becomes unavailable, a CDR generating node can store any unshipped CDRs so that they can be sent to the charging server at a later time. When the charging server becomes available again, the CDR generating node can send the unshipped CDRs to the charging server.

Under some circumstances, however, a CDR generating node can run out of disk space for storing CDRs. For example, a charging server could be unavailable for an extended period of time, and during this time the CDR generating node could generate a large number of CDRs that exceeds the amount of disk space that has been reserved for storing CDRs.

One aspect of the present disclosure involves a scenario in which a charging server has become unavailable to receive CDRs from a CDR generating node and the CDR generating node has run out of disk space (or at least has come close to running out of disk space) for storing CDRs. The present disclosure proposes various techniques that make it possible for unshipped CDRs to continue to be stored in that type of situation.

In accordance with one aspect of the present disclosure, a CDR generating node that has exhausted its disk space can cause unshipped CDRs to be backed up to another CDR generating node that has available disk space. In this way, the backup of unshipped CDRs can be distributed across a plurality of CDR generating nodes. A CDR generating node that has exhausted its disk space and that initiates the backup of unshipped CDRs may be referred to herein as an original CDR generating node. A CDR generating node that has available disk space and that receives CDRs from an original CDR generating node may be referred to herein as a recipient CDR generating node.

In some embodiments, an original CDR generating node can initiate the backup of unshipped CDRs in response to making at least two determinations. First, the original CDR generating node can determine that the charging server that would normally receive the CDRs is unavailable to receive the CDRs. Second, the original CDR generating node can determine that it does not have a sufficient amount of available storage to store the CDRs.

To facilitate the distributed backup of unshipped CDRs, CDR generating nodes can be configured to advertise certain information, such as the charging servers they are interfacing with and the level of disk saturation (e.g., how much storage space is available). When a particular CDR generating node determines that it should initiate the backup of CDRs (e.g., based on making the determinations described above), the CDR generating node can refer to the information that it has received from other CDR generating nodes. Based on this information, the original CDR generating node can select a recipient CDR generating node that will be used for backup.

When the recipient CDR generating node receives the unshipped CDRs from the original CDR generating node, the recipient CDR generating node can send an acknowledgement to the original CDR generating node. The original CDR generating node can interpret the acknowledgement as an indication that the recipient CDR generating node will now assume responsibility for the unshipped CDRs. Consequently, the original CDR generating node does not have to take any further action with respect to the unshipped CDRs. When the charging server becomes available again, the recipient CDR generating node can send the unshipped CDRs to the charging server.

An example will be described in relation to FIGS. 1A-C. Reference is initially made to FIG. 1A, which illustrates an example of a system 100 in which the techniques disclosed herein can be utilized. The system 100 includes a first CDR generating node 102 and a second CDR generating node 104. Both the first CDR generating node 102 and the second CDR generating node 104 are configured to generate CDRs. In addition, both the first CDR generating node 102 and the second CDR generating node 104 can be configured to send the CDRs that they generate to the same charging server 130.

From time to time, the charging server 130 may experience a failure or may get overwhelmed by the rate at which CDRs are being produced by the CDR generating node and become unavailable, at least temporarily. The first CDR generating node 102 and the second CDR generating node 104 can be configured so that when this occurs, they store the CDRs that they generate while the charging server 130 is unavailable. FIG. 1A shows the first CDR generating node 102 with a first CDR storage area 106-1 and the second CDR generating node 104 with a second CDR storage area 106-2. In this context, the term "CDR storage area" refers to computer storage (or a portion thereof) that can be used for storing CDRs. In some embodiments, a CDR storage area can be specifically reserved and/or dedicated for storing CDRs. In other words, a CDR storage area can be used for storing CDRs and nothing else. Alternatively, in other embodiments, a CDR storage area can be used for storing CDRs along with other items.

In some embodiments, the CDR storage area corresponding to a particular CDR generating node can be local to that CDR generating node. In FIG. 1A, the first CDR storage area 106-1 is shown as part of the first CDR generating node 102, thereby indicating that the first CDR storage area 106-1 is local to the first CDR generating node 102. Similarly, the second CDR storage area 106-2 is shown as part of the second CDR generating node 104, thereby indicating that the second CDR storage area 106-2 is local to the second CDR generating node 104. In an alternative embodiment, the CDR storage area corresponding to a particular CDR generating node can be external to that CDR generating node. For example, the CDR storage area corresponding to a particular CDR generating node can be distinct from, but communicatively coupled to, the CDR generating node.

Under some circumstances, however, a CDR generating node may not be able to store all of the CDRs that it generates. For example, suppose that the charging server 130 is unavailable for an extended period of time, and that during this time the first CDR generating node 102 generates a large number of CDRs. Further suppose that the first CDR storage area 106-1 is not large enough to store all of the CDRs that the first CDR generating node 102 generates while the charging server 130 is unavailable. For example, suppose that the first CDR storage area 106-1 is large enough to store a first plurality of CDRs 108-1 but not large enough to store a second plurality of CDRs 108-2. In other words, storing the first plurality of CDRs 108-1 in the first CDR storage area 106-1 exhausts the first CDR storage area 106-1 such that additional CDRs should not (or cannot) be stored in the first CDR storage area 106-1. In accordance with one aspect of the present disclosure, the first CDR generating node 102 can, in response to determining that the first CDR storage area 106-1 has been saturated or exhausted, cause additional CDRs (such as the second plurality of CDRs 108-2) to be backed up to another CDR generating node (such as the second CDR generating node 104).

When a CDR storage area (e.g., the first CDR storage area 106-1) has reached a point where it should not (or cannot) store additional CDRs, it may be said that the CDR storage area is "saturated" (or "exhausted"). In other words, when a CDR storage area has become saturated or exhausted, this means that the CDR storage area has been filled to an extent where it should not (or cannot) store additional CDRs. In some embodiments, a CDR storage area can be saturated or exhausted when the CDR storage area is more than X % full (where X can be a configurable parameter).

In some embodiments, the determination about whether the first CDR storage area 106-1 has been saturated or exhausted can depend on a usage level 110 and a saturation level 112 of the first CDR storage area 106-1.

In this context, the "usage level" of a CDR storage area can indicate the extent to which the CDR storage area is being used. There are many different ways that the usage level of a CDR storage area can be expressed. In some embodiments, the usage level of a CDR storage area can be expressed as a percentage (e.g., the CDR storage area is N % full). In some embodiments, the usage level of a CDR storage area can indicate the extent to which the CDR storage area is being used to store CDRs. In some embodiments, the usage level of a CDR storage area can indicate the extent to which the CDR storage area is being used to store CDRs and/or other items as well.

In this context, the "saturation level" of a CDR storage area can refer to a usage level at which the CDR storage area should not be used to store additional CDRs. In other words, when the usage level of a CDR storage area reaches the saturation level, this means that the CDR storage area should not be used to store additional CDRs and subsequently generated CDRs should be backed up to another CDR generating node. In some embodiments, the saturation level of a CDR storage area can be expressed as a percentage (e.g., when the CDR storage area is Y % full, it should not be used to store additional CDRs).

In the system 100 shown in FIG. 1A, the first CDR generating node 102 can be configured to monitor the usage level 110 of the first CDR storage area 106-1 and determine whether the usage level 110 of the first CDR storage area 106-1 has reached the saturation level 112. Once the first CDR generating node 102 determines that the usage level 110 of the first CDR storage area 106-1 equals or exceeds the saturation level 112, then the first CDR generating node 102 can infer that the first CDR storage area 106-1 should not be used to store additional CDRs, such as the second plurality of CDRs 108-2 in the present example. In response, the first CDR generating node 102 can attempt to back up the second plurality of CDRs 108-2 to another CDR generating node, such as the second CDR generating node 104.

To facilitate the backup of CDRs, the first CDR generating node 102 and the second CDR generating node 104 can be configured to advertise certain information, such as the charging servers they are interfacing with and their availability to store additional CDRs. In some embodiments, CDR generating nodes can advertise this information by sending certain kinds of messages, which may be referred to herein as CDR backup capability messages. In some embodiments, CDR backup capability messages can take the form of GPRS transfer protocol (GTP) echo request/response messages, as will be described in greater detail below.

Figure 1B:
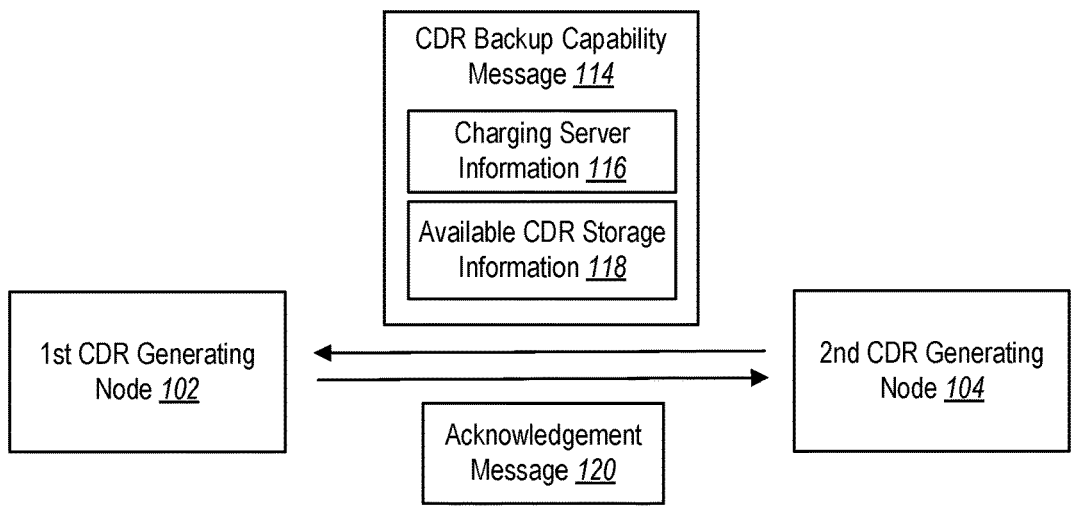

FIG. 1B shows an example of a CDR backup capability message 114 that the second CDR generating node 104 can send to the first CDR generating node 102. The first CDR generating node 102 can send a similar CDR backup capability message to the second CDR generating node 104, although this is not shown in FIG. 1B.

The CDR backup capability message 114 can include charging server information 116 and available CDR storage information 118. The charging server information 116 can indicate what charging server(s) the second CDR generating node 104 is interfacing with. For instance, in the present example, the charging server information 116 can indicate that the second CDR generating node 104 is interfacing with the same charging server 130 as the first CDR generating node 102. If the second CDR generating node 104 is also interfacing with one or more other charging servers in addition to the charging server 130, the charging server information 116 can indicate this as well. The available CDR storage information 118 can indicate to what extent the second CDR storage area 106-2 corresponding to the second CDR generating node 104 has available storage (e.g., for storing additional CDRs). In some embodiments, the available CDR storage information 118 can indicate a usage level of the second CDR storage area 106-2. Alternatively, or in addition, the available CDR storage information 118 can indicate whether the usage level of the second CDR storage area 106-2 exceeds the saturation level of the second CDR storage area 106-2.

When the first CDR generating node 102 detects that the charging server 130 is not available and also determines that the first CDR storage area 106-1 has been exhausted and should not (or cannot) be used to store additional CDRs 108-2, the first CDR generating node 102 can select another CDR generating node to be used for backing up the CDRs 108-2. The selection of another CDR generating node can be based at least in part on the information that has been received from other CDR generating nodes, such as the information contained in the CDR backup capability message 114 that the second CDR generating node 104 sends to the first CDR generating node 102. In some embodiments, the first CDR generating node 102 can receive a plurality of CDR backup capability messages from a plurality of other CDR generating nodes, and the first CDR generating node 102 can select one or more of the plurality of CDR generating nodes for backing up the additional CDRs 108-2.

Examples of factors that can be taken into consideration when making this selection will be described in greater detail below.

Figure 1C:
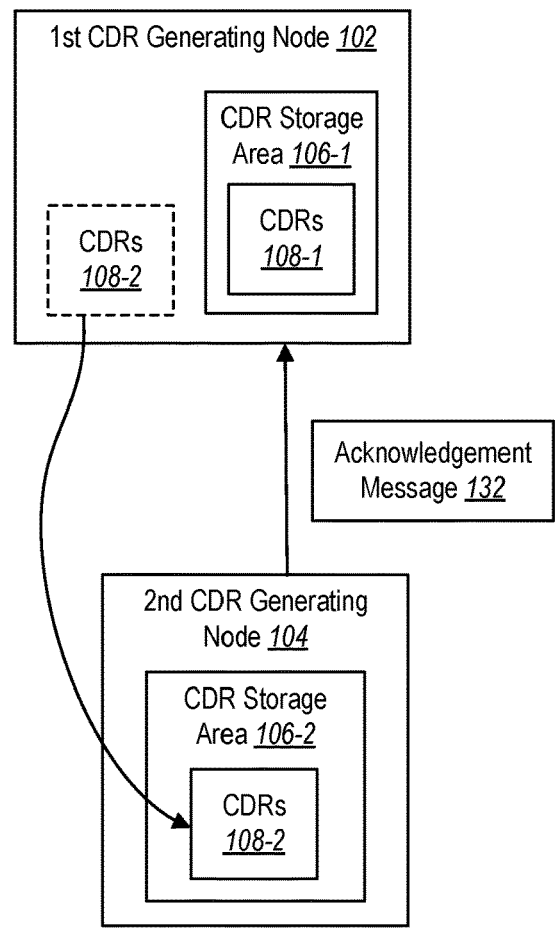

Reference is now made to FIG. 1C. When the first CDR generating node 102 has selected the second CDR generating node 104 to be used for backing up the additional CDRs 108-2, the first CDR generating node 102 can cause the CDRs 108-2 to be sent to the second CDR generating node 104. Thus, in the present example, the first CDR generating node 102 is the original CDR generating node and the second CDR generating node 104 is the recipient CDR generating node.

In response to receiving the CDRs 108-2 from the first CDR generating node 102, the second CDR generating node 104 can send an acknowledgement message 132 to the first CDR generating node 102. The acknowledgement message 132 can indicate that the second CDR generating node 104 has received the CDRs 108-2. The acknowledgement message 132 can also indicate that the second CDR generating node 104 will assume further responsibility for the CDRs 108-2 and will send the CDRs 108-2 to the charging server 130 when the charging server 130 becomes available again. The first CDR generating node 102 can be configured so that, once it receives the acknowledgement message 132 from the second CDR generating node 104, the first CDR generating node 102 does not take any additional actions with respect to the CDRs 108-2. Instead, the first CDR generating node 102 can allow the second CDR generating node 104 to assume further responsibility for the CDRs 108-2.

The second CDR generating node 104 can monitor the availability of the charging server 130. When the charging server 130 becomes available again, the second CDR generating node 104 can send the CDRs 108-2 to the charging server 130.

Figure 2:
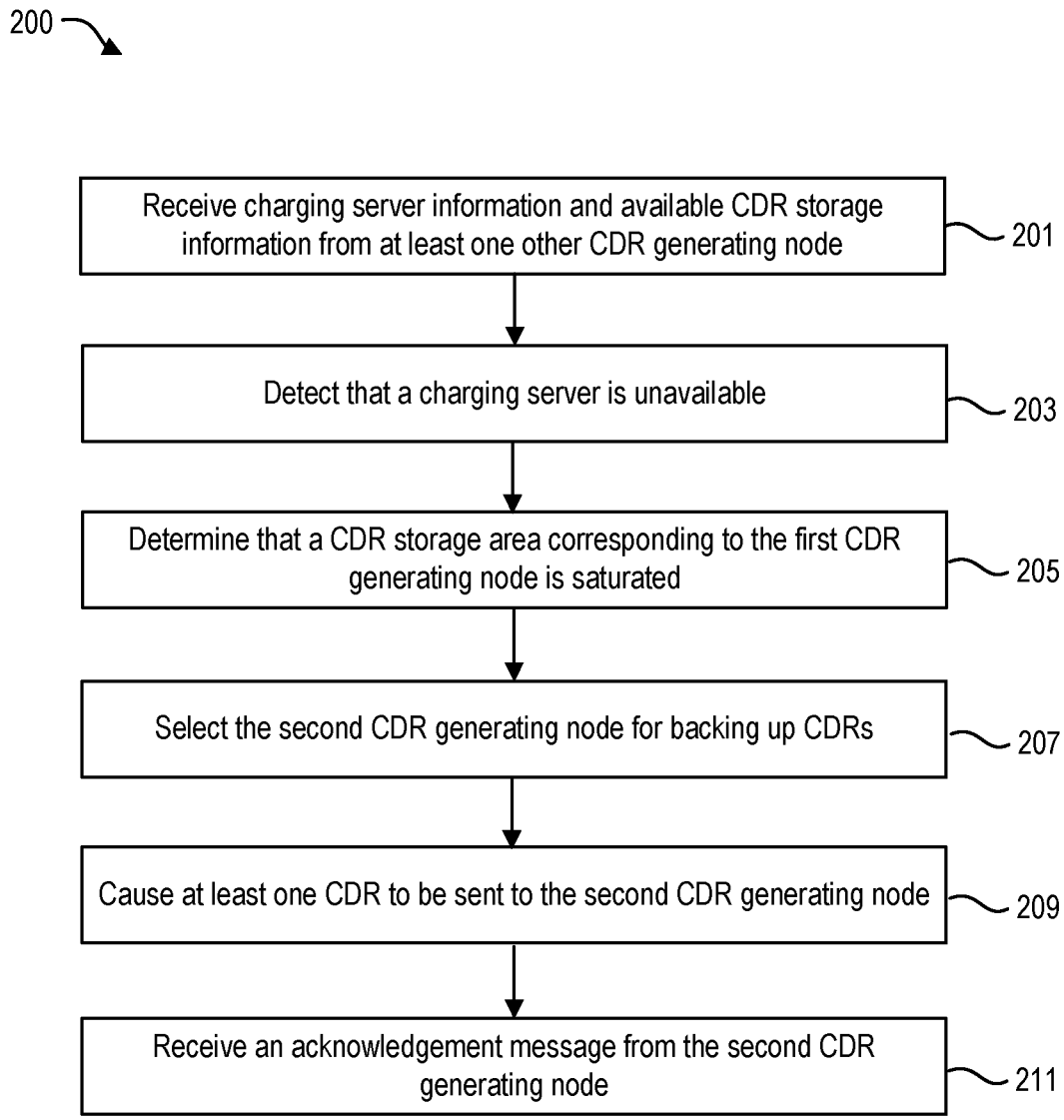
FIG. 2 illustrates an example of a method that can be implemented by the original CDR generating node in the system shown in FIGS. 1A-C.

FIG. 2 illustrates an example of a method 200 that can be implemented by the first CDR generating node 102 (the original CDR generating node) in accordance with an embodiment of the present disclosure.

At 201, the first CDR generating node 102 can receive charging server information 116 and available CDR storage information 118 from at least one other CDR generating node, such as the second CDR generating node 104. In some embodiments, the charging server information 116 and the available CDR storage information 118 can be received in one or more CDR backup capability messages 114. The charging server information 116 received from the second CDR generating node 104 can indicate that the second CDR generating node 104 is communicatively coupled to the same charging server 130 as the first CDR generating node 102. The available CDR storage information 118 received from the second CDR generating node 104 can indicate that that the second CDR generating node 104 has storage space available for storing additional CDRs.

At 203, the first CDR generating node 102 can detect that a charging server 130 is unavailable to receive CDRs from the first CDR generating node 102. In some embodiments, detecting that the charging server 130 is unavailable can involve sending a message to the charging server 130 and then not receiving an acknowledgement within a pre-defined time period. This is sometimes referred to as timing out.

At 205, the first CDR generating node 102 can determine that a CDR storage area 106-1 corresponding to the first CDR generating node 102 is saturated (or exhausted) and should no longer be used to store additional CDRs. In some embodiments, determining that the CDR storage area 106-1 is saturated comprises determining that a usage level 110 of the CDR storage area 106-1 is greater than or equal to a saturation level 112 of the CDR storage area 106-1.

At 207, the first CDR generating node 102 can select the second CDR generating node 104 for backing up CDRs 108-2. In other words, the first CDR generating node 102 can select the second CDR generating node 104 for storing CDRs 108-2 that the first CDR generating node 102 generates while the charging server 130 is unavailable and the CDR storage area 106-1 corresponding to the first CDR generating node 102 is saturated. The selection of the second CDR generating node 104 for storing the CDRs 108-2 can be based at least in part on the charging server information 116 and the available CDR storage information 118 that the first CDR generating node 102 previously received from the second CDR generating node 104 (e.g., in a CDR backup capability message 114). In some embodiments, the first CDR generating node 102 can select the second CDR generating node 104 from among a plurality of CDR generating nodes that have sent charging server information and available CDR storage information to the first CDR generating node 102.

At 209, the first CDR generating node 102 can cause at least one CDR 108-2 to be sent to the second CDR generating node 104. In some embodiments, causing CDR(s) 108-2 to be sent to the second CDR generating node 104 can include sending one or more commands or messages to components within the first CDR generating node 102 that are responsible for transmitting data to destination(s) that are external to the first CDR generating node 102.

At 211, the first CDR generating node 102 can receive an acknowledgement message 132 from the second CDR generating node 104. The acknowledgement message 132 can be received in response to causing the CDR(s) 108-2 to be sent to the second CDR generating node 104 (at 209). The acknowledgement message 132 can indicate that the second CDR generating node 104 has received the CDR(s) 108-2 and that the second CDR generating node 104 will send the CDR(s) 108-2 to the charging server 130 when the charging server 130 becomes available again. In response to receiving the acknowledgement message 132, the first CDR generating node 102 can allow the second CDR generating node 104 to take further responsibility for the CDR(s) 108-2 and take no further action in connection with the CDR(s) 108-2.

Figure 3:
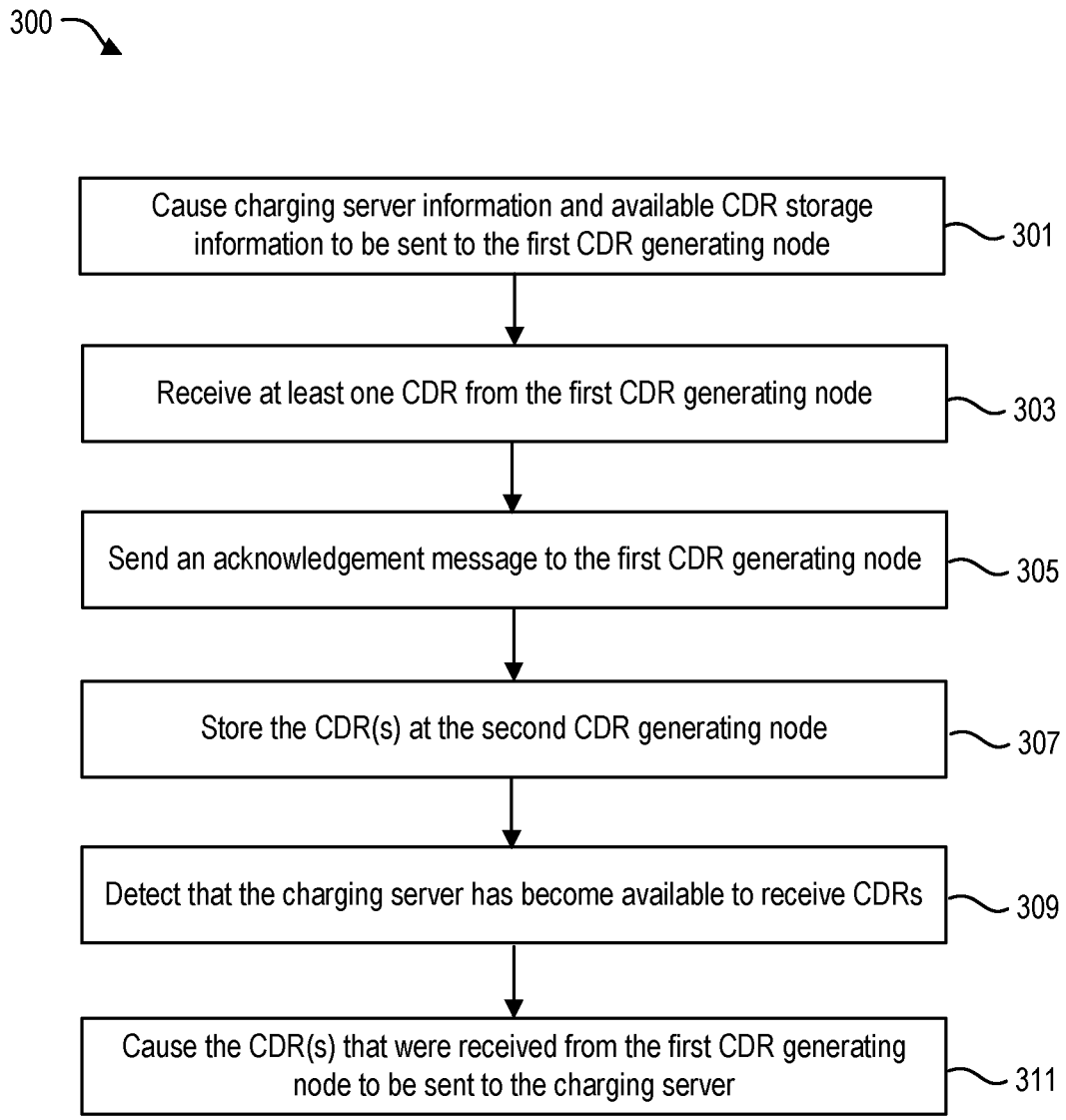
FIG. 3 illustrates an example of a method that can be implemented by the recipient CDR generating node in the system shown in FIGS. 1A-C.

FIG. 3 illustrates an example of a method 300 that can be implemented by the second CDR generating node 104 (the recipient CDR generating node) in accordance with an embodiment of the present disclosure.

At 301, the second CDR generating node 104 can send charging server information 116 and available CDR storage information 118 to the first CDR generating node 102. The charging server information 116 can indicate that the second CDR generating node 104 is communicatively coupled to the same charging server 130 as the first CDR generating node 102. The available CDR storage information 118 can indicate that the second CDR generating node 104 has storage space available.

At 303, the second CDR generating node 104 can receive at least one CDR 108-2 from the first CDR generating node 102. The CDR(s) 108-2 can be generated by the first CDR generating node 102 while the charging server 130 is unavailable and while the CDR storage area 106-1 corresponding to the first CDR generating node 102 is saturated and should not be used to store additional CDRs.

At 305, the second CDR generating node 104 can send an acknowledgement message 132 to the first CDR generating node 102. The acknowledgement message 132 can indicate that the second CDR generating node 104 has received the CDR(s) 108-2 from the first CDR generating node 102, and that the second CDR generating node 104 will send the CDR(s) 108-2 to the charging server 130 when the charging server 130 becomes available again.

At 307, the second CDR generating node 104 can store the CDR(s) 108-2. The CDR(s) 108-2 can be stored in a CDR storage area 106-2 corresponding to the second CDR generating node 104.

At 309, the second CDR generating node 104 can detect that the charging server 130 has become available to receive CDRs. In some embodiments, detecting that the charging server 130 has become available to receive CDRs can include receiving one or more communications from the charging server 130.

At 311, the second CDR generating node 104 can cause the CDR(s) 108-2 that were received from the first CDR generating node 102 to be sent to the charging server 130. This can be done in response to detecting that the charging server 130 has become available. In some embodiments, causing CDR(s) 108-2 to be sent to the charging server 130 can include sending one or more commands or messages to components within the second CDR generating node 104 that are responsible for transmitting data to destination(s) that are external to the second CDR generating node 104.

As discussed above, a CDR generating node can receive a plurality of CDR backup capability messages from a plurality of other CDR generating nodes. When a CDR generating node determines that it should try to back up some CDRs on another CDR generating node (e.g., because a charging server is unavailable and the CDR generating node has run out of disk space for storing CDRs), the CDR generating node can select another CDR generating node to back up CDRs. This selection can be made from among all the other CDR generating nodes from which CDR backup capability messages have been received.

Figure 4A:
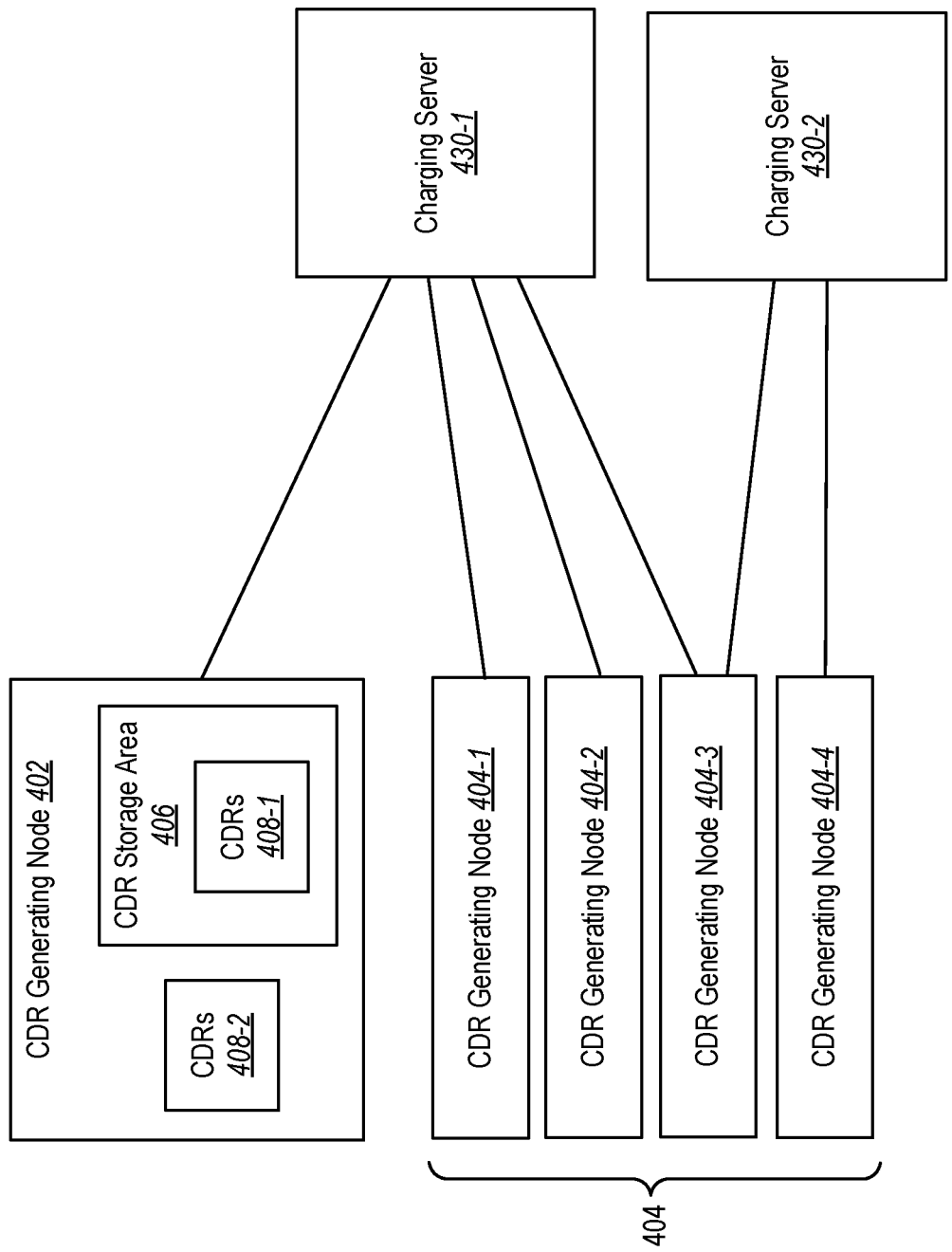
FIGS. 4A-C illustrate an example showing how a CDR generating node can select another CDR generating node to back up CDRs.
Figure 4B:
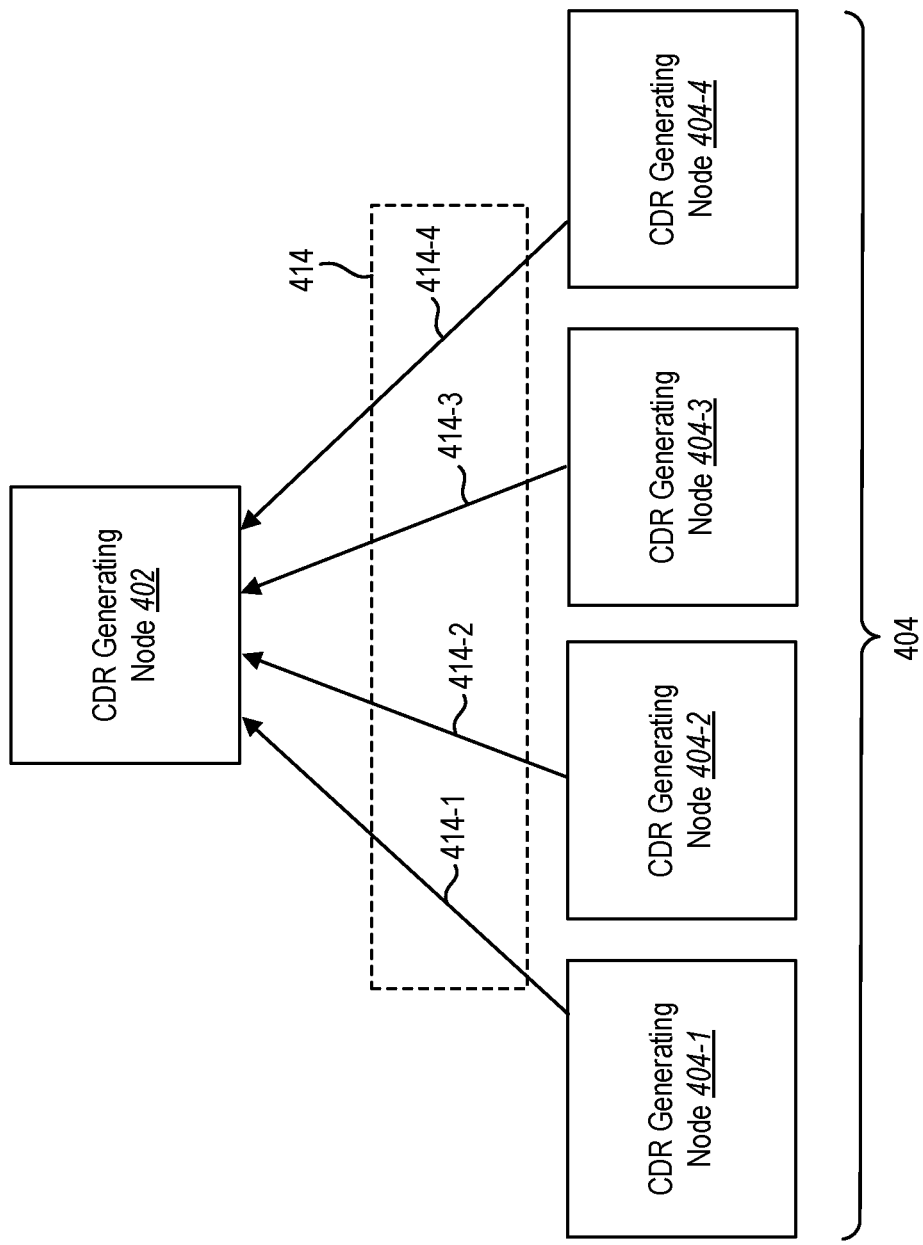
Figure 4C:
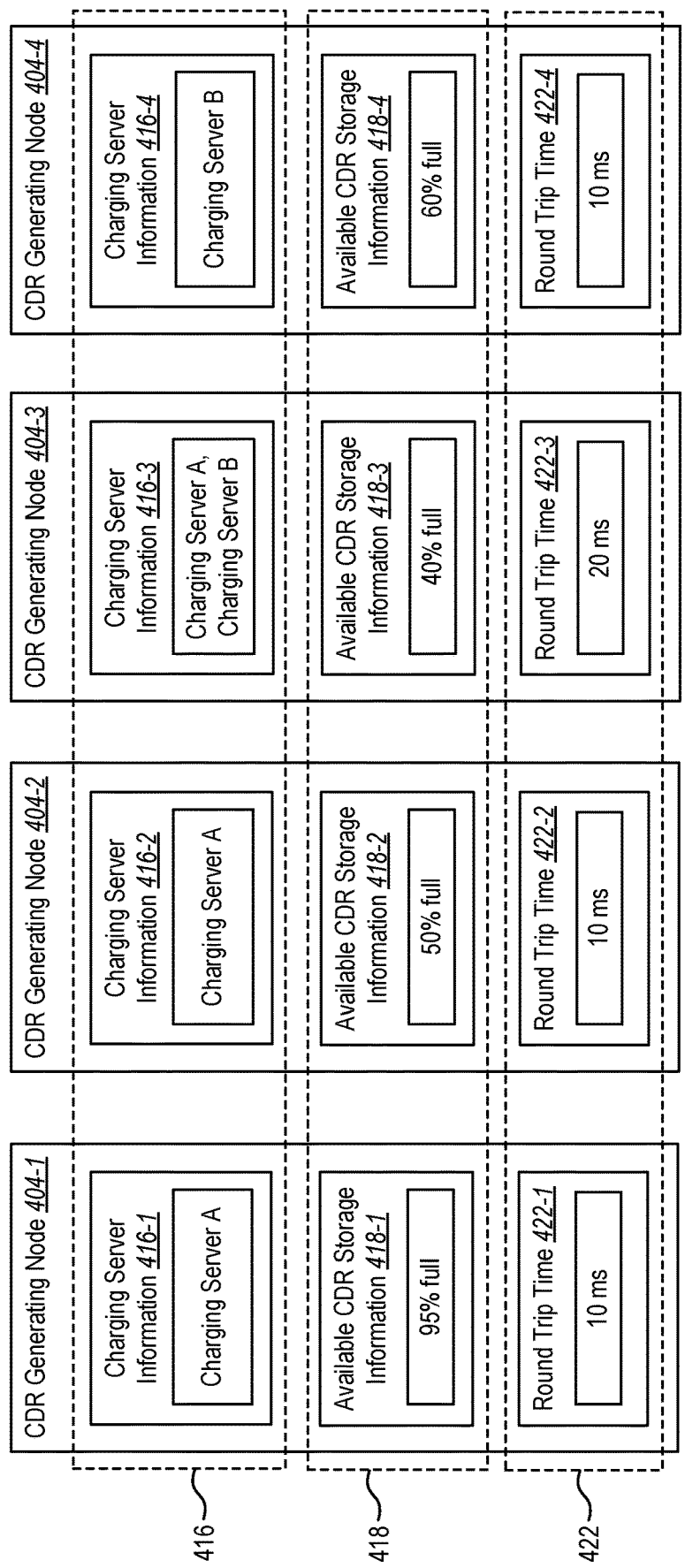

FIGS. 4A-C illustrate an example showing how a CDR generating node can select another CDR generating node to back up CDRs. Reference is initially made to FIG. 4A, which shows a CDR generating node 402 that is communicatively coupled to a charging server that will be referred to as charging server A 430-1.

The CDR generating node 402 is similar in some respects to the CDR generating node 102 that was described above in connection with FIGS. 1A-C. The CDR generating node 402 is configured to generate CDRs. Under normal circumstances, when charging server A 430-1 is available and the CDR generating node 402 is communicatively coupled to charging server A 430-1, the CDR generating node 402 can be configured to send the CDRs that it generates to charging server A 430-1. From time to time, however, charging server A 430-1 may experience a failure and become unavailable, at least temporarily. When this occurs, the CDR generating node 402 can store the CDRs that are generated while charging server A 430-1 is unavailable and send the CDRs to charging server A 430-1 when charging server A 430-1 becomes available again. FIG. 4A shows the CDR generating node 402 with a plurality of CDRs 408-1 stored in a CDR storage area 406.

Under some circumstances, however, the CDR generating node 402 may not be able to store all of the CDRs that it generates. For example, suppose that the CDR storage area 406 is large enough to store the first plurality of CDRs 408-1 but not large enough to store a second plurality of CDRs 408-2. In accordance with one aspect of the present disclosure, the CDR generating node 402 can, in response to determining that the CDR storage area 406 has been exhausted, cause additional CDRs (such as the second plurality of CDRs 408-2) to be backed up to another CDR generating node.

FIG. 4A also shows a plurality of other CDR generating nodes 404, including a first CDR generating node 404-1, a second CDR generating node 404-2, a third CDR generating node 404-3, and a fourth CDR generating node 404-4. The CDR generating node 402 can select one of the other CDR generating nodes 404 to back up the CDRs 408-2. The other CDR generating nodes 404 can be communicatively coupled to charging server A 430-1 and/or to at least one other charging server (e.g., charging server B 430-2), as will be described in greater detail below.

FIG. 4B shows the CDR generating node 402 receiving a plurality of CDR backup capability messages 414 from the plurality of other CDR generating nodes 404. In particular, FIG. 4B shows the CDR generating node 402 receiving a first CDR backup capability message 414-1 from the first CDR generating node 404-1, a second CDR backup capability message 414-2 from the second CDR generating node 404-2, a third CDR backup capability message 414-3 from the third CDR generating node 404-3, and a fourth CDR backup capability message 414-4 from the fourth CDR generating node 404-4.

In some embodiments, each of the CDR backup capability messages 414 can be similar to the CDR backup capability message 114 that was described above in connection with FIG. 1B. For example, each CDR backup capability message 414 can include charging server information 116 and available CDR storage information 118, as described above.

When the CDR generating node 402 selects another CDR generating node 404 to back up CDRs, the CDR generating node 402 can take into consideration the information (e.g., charging server information and available CDR storage information) that is received from the plurality of CDR generating nodes 404 in the CDR backup capability messages 414. The CDR generating node 402 can also take into consideration other information as well. For example, the CDR generating node 402 can take into consideration information about the round-trip time associated with the plurality of CDR generating nodes 404.

FIG. 4C illustrates information that can be obtained and taken into consideration by the CDR generating node 402 when selecting one of the plurality of CDR generating nodes 404 to back up the CDRs 408-2. In the depicted example, the CDR generating node 402 takes into consideration at least the following information: charging server information 416, available CDR storage information 418, and round-trip time 422. FIG. 4C shows this information in relation to each of the other CDR generating nodes 404 that send backup capability messages 414 to the CDR generating node 402. In particular, FIG. 4A shows charging server information 416-1, available CDR storage information 418-1, and a round-trip time 422-1 for the first CDR generating node 404-1. In addition, FIG. 4B shows charging server information 416-2, available CDR storage information 418-2, and a round-trip time 422-2 for the second CDR generating node 404-2. FIG. 4C also shows charging server information 416-3, available CDR storage information 418-3, and a round-trip time 422-3 for the third CDR generating node 404-3. Finally, FIG. 4C shows charging server information 416-4, available CDR storage information 418-4, and a round-trip time 422-4 for the fourth CDR generating node 404-4.

The charging server information 416 and the available CDR storage information 418 can be similar to the charging server information 116 and the available CDR storage information 118 that were described above in connection with FIG. 1B. Thus, the charging server information 416 corresponding to a particular CDR generating node 404 can indicate what charging server(s) that CDR generating node 404 is interfacing with. The available CDR storage information 418 corresponding to a particular CDR generating node 404 can indicate to what extent the CDR generating node 404 has availability to store additional CDRs.

From the perspective of the CDR generating node 402, the round-trip time 422 associated with another CDR generating node 404 can be a measure of the distance between the CDR generating node 402 and the other CDR generating node 404. More specifically, the round-trip time 422 associated with a particular CDR generating node 404 can indicate how much time elapses between (a) the CDR generating node 402 sending a message to the CDR generating node 404, and (b) the CDR generating node 402 receiving an acknowledgement of the message from the CDR generating node 404. In some embodiments, GTP echo request/response messages can be used to determine round-trip time. For example, an original CDR generating node can use an echo request sent to probable recipient nodes, and the echo responses received from them to arrive at the round-trip time to each of the probable recipients.

Specific values are provided in FIG. 4C for the charging server information 416, the available CDR storage information 418, and the round-trip time 422. These specific values will be discussed in greater detail below. However, these values are provided for purpose of example only and should not be interpreted as limiting the scope of the present disclosure.

In the depicted example, the CDR generating node 402 obtains the following information about the first CDR generating node 404-1. The charging server information 416-1 indicates that the first CDR generating node 404-1 is communicatively coupled to charging server A 430-1. The available CDR storage information 418-1 indicates that the CDR storage area corresponding to the first CDR generating node 404-1 is 95% full. The round-trip time 422-1 corresponding to the first CDR generating node 404-1 is 10 ms.

The CDR generating node 402 obtains the following information about the second CDR generating node 404-2. The charging server information 416-2 indicates that the second CDR generating node 404-2 is communicatively coupled to charging server A 430-1. The available CDR storage information 418-2 indicates that the CDR storage area corresponding to the second CDR generating node 404-2 is 50% full. The round-trip time 422-2 corresponding to the second CDR generating node 404-2 is 10 ms.

The CDR generating node 402 obtains the following information about the third CDR generating node 404-3. The charging server information 416-3 indicates that the third CDR generating node 404-3 is communicatively coupled to both charging server A 430-1 and charging server B 430-2. The available CDR storage information 418-3 indicates that the CDR storage area corresponding to the third CDR generating node 404-3 is 40% full. The round-trip time 422-3 corresponding to the third CDR generating node 404-3 is 20 ms.

The CDR generating node 402 obtains the following information about the fourth CDR generating node 404-4. The charging server information 416-4 indicates that the fourth CDR generating node 404-4 is communicatively coupled to charging server B 430-2. The available CDR storage information 418-4 indicates that the CDR storage area corresponding to the fourth CDR generating node 404-4 is 60% full. The round-trip time 422-4 corresponding to the fourth CDR generating node 404-4 is 10 ms.

Figure 5:
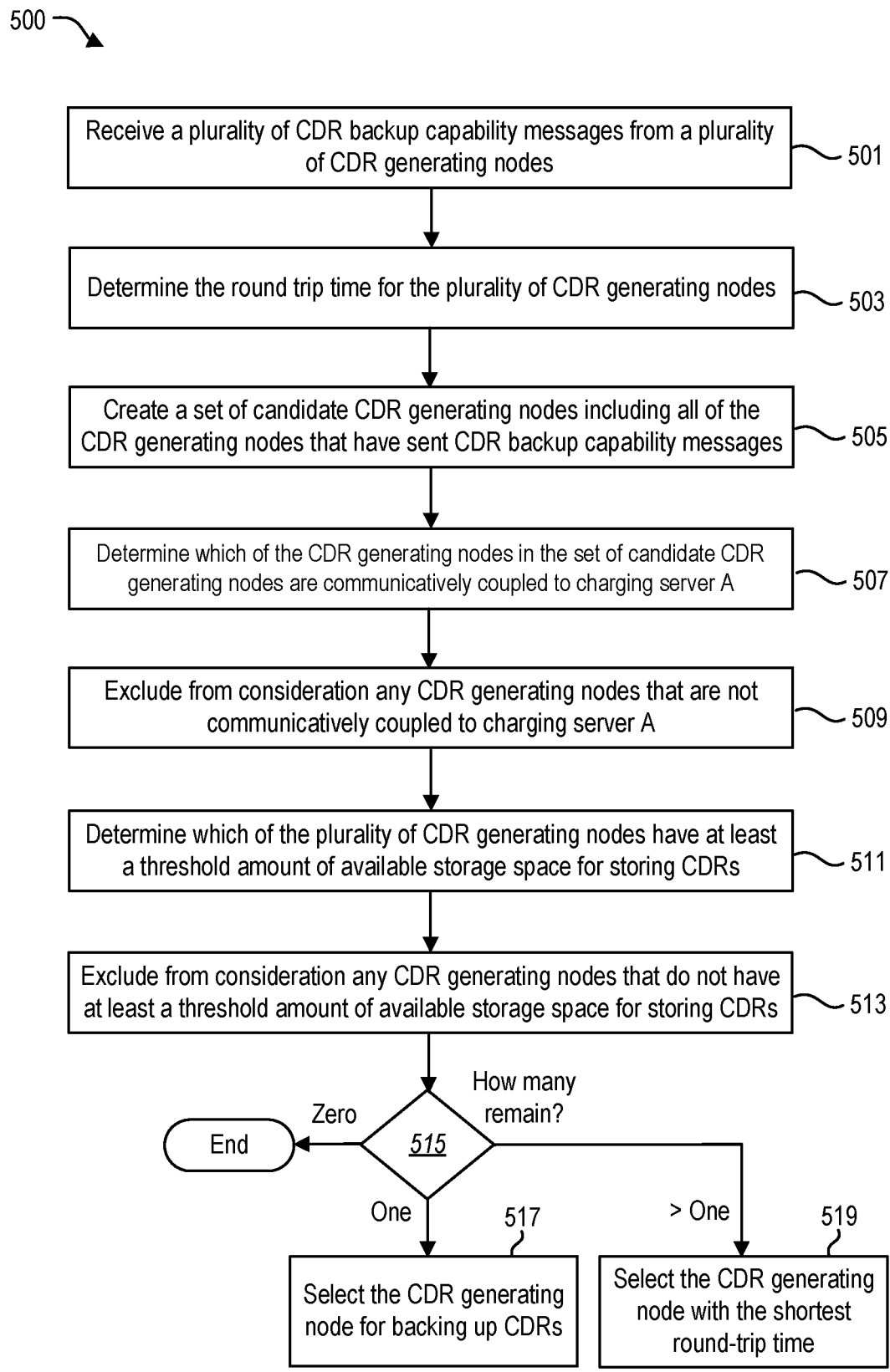
FIG. 5 illustrates an example of a method showing how a CDR generating node can select one of a plurality of CDR generating nodes to back up CDRs.

FIG. 5 illustrates an example of a method 500 showing how the CDR generating node 402 can select one of the CDR generating nodes 404 to back up the CDRs 408-2. For purposes of example, the depicted method 500 illustrates how the information shown in FIG. 4C can be used to make the selection.

At 501, the CDR generating node 402 can receive a plurality of CDR backup capability messages 414 from a plurality of CDR generating nodes 404. As discussed above, the CDR backup capability messages 414 can include charging server information 416 and available CDR storage information 418.

At 503, the CDR generating node 402 can determine the round-trip time 422 for the plurality of CDR generating nodes 404.

At 505, the CDR generating node 402 can create a set of candidate CDR generating nodes 404. The set of candidate CDR generating nodes 404 can include all of the CDR generating nodes 404 that the CDR generating node 402 is considering using to back up CDRs. Initially, all of the CDR generating nodes 404 that have sent CDR backup capability messages 414 to the CDR generating node 402 can be added to the set of candidate CDR generating nodes 404. In the present example, the set of candidate CDR generating nodes 404 can initially include the first CDR generating node 404-1, the second CDR generating node 404-2, the third CDR generating node 404-3, and the fourth CDR generating node 404-4.

At 507, the CDR generating node 402 can determine which of the CDR generating nodes 404 in the set of candidate CDR generating nodes 404 are communicatively coupled to charging server A 430-1 (which is the charging server to which the CDR generating node 402 is communicatively coupled). The charging server information 416 can be used to make this determination. In the present example, the CDR generating node 402 can determine that the first CDR generating node 404-1, the second CDR generating node 404-2, and the third CDR generating node 404-3 are communicatively coupled to charging server A 430-1.

At 509, the CDR generating node 402 can exclude from consideration any CDR generating nodes 404 that are not communicatively coupled to charging server A 430-1. In other words, in the present example, only those CDR generating nodes 404 that are communicatively coupled to charging server A 430-1 (which, as noted above, is the charging server to which the CDR generating node 402 is communicatively coupled) are considered for being used to back up the CDRs 408-2. Any CDR generating nodes 404 that are not communicatively coupled to charging server A 430-1 are removed from the set of candidate CDR generating nodes 404. Thus, in the present example, the fourth CDR generating node 404-4 is removed from the set of candidate CDR generating nodes 404 because the fourth CDR generating node 404-4 is not communicatively coupled to charging server A 430-1.

At 511, the CDR generating node 402 can determine which of the plurality of CDR generating nodes 404 have at least a threshold amount of available storage space for storing CDRs. The CDR storage information 418 can be used to make this determination. There are many different ways that the threshold amount of available storage space can be expressed. In the present example, it will be assumed that a CDR generating node 404 has at least the threshold amount of available storage space if the CDR storage area corresponding to the CDR generating node 404 is no more than 80% full. Of course, that specific value is provided for purposes of example only and should not be interpreted as limiting the scope of the present disclosure.

At 513, the CDR generating node 402 can exclude from consideration any CDR generating nodes 404 that do not have at least a threshold amount of available storage space for storing CDRs. In other words, in the present example, only those CDR generating nodes 404 that have at least a threshold amount of available storage space for storing CDRs are considered for being used to back up the CDRs 408-2. The CDR generating nodes 404 that do not have at least a threshold amount of available storage space for storing CDRs are removed from the set of candidate CDR generating nodes 404. Thus, in the present example, the first CDR generating node 404-1 is removed from the set of candidate CDR generating nodes 404 because the CDR storage space corresponding to the first CDR generating node 404-1 is more than 80% full (specifically, it is 95% full).

At 515, the CDR generating node 402 can determine how many CDR generating nodes 404 remain in the set of candidate CDR generating nodes 404 after excluding the CDR generating nodes 404 that are not communicatively coupled to charging server A 430-1 and that do not have at least a threshold amount of available storage space for storing CDRs.

If zero CDR generating nodes 404 remain in the set of candidate CDR generating nodes 404, then the method 500 ends without selecting a CDR generating node 404 to back up the CDRs 408-2.

If only one CDR generating node 404 remains in the set of candidate CDR generating nodes 404, then at 517 that CDR generating node 404 is selected as the CDR generating node 404 that will be used to back up the CDRs 408-2.

If a plurality of CDR generating nodes 404 remain in the set of candidate CDR generating nodes 404, then at 519 the CDR generating node 402 selects the CDR generating node 404 that has the shortest round-trip time 422.

In the present example, two CDR generating nodes 404 remain in the set of candidate CDR generating nodes 404: the second CDR generating node 404-2 and the third CDR generating node 404-3. The CDR generating node 402 selects the second CDR generating node 404-2 to back up the CDRs 408-2 because the round-trip time 422-2 associated with the second CDR generating node 404-2 (namely, 10 ms) is shorter than the round-trip time 422-3 associated with the third CDR generating node 404-3 (namely, 20 ms).

If there are a plurality of CDR generating nodes 404 that remain in the set of candidate CDR generating nodes 404 and that have the same round-trip time 422, then the CDR generating node 402 can randomly select one of the remaining CDR generating nodes 404 for backing up CDRs. Alternatively, the CDR generating node 402 can select one of the remaining CDR generating nodes 404 for backing up CDRs based on one or more additional factors, such as disk space. More specifically, if there are a plurality of CDR generating nodes 404 that remain in the set of candidate CDR generating nodes 404 and that have the same round-trip time 422, then the CDR generating node 402 can select the CDR generate node 404 that has the highest amount of free disk space.

In embodiments described previously, an original CDR generating node selects a recipient CDR generating node to back up CDRs. The recipient CDR generating node is communicatively coupled to the same charging server as the original CDR generating node. When the charging server becomes available again, the recipient CDR generating node sends the CDRs to the charging server.

In some embodiments, however, an original CDR generating node could select another type of node to back up CDRs. For example, an original CDR generating node could select a georedundant instance of the original CDR generating node to back up CDRs. The georedundant instance of the original CDR generating node may not be communicatively coupled to the same charging server as the original CDR generating node. In fact, the georedundant instance of the original CDR generating node may not be communicatively coupled to any charging server at all. Thus, in some embodiments, when the charging server becomes available again, the georedundant instance of the original CDR generating node does not send the CDRs to the charging server. Instead, the georedundant instance of the original CDR generating node sends the CDRs back to the original CDR generating node, which then sends the CDRs to the charging server.

Figure 6:
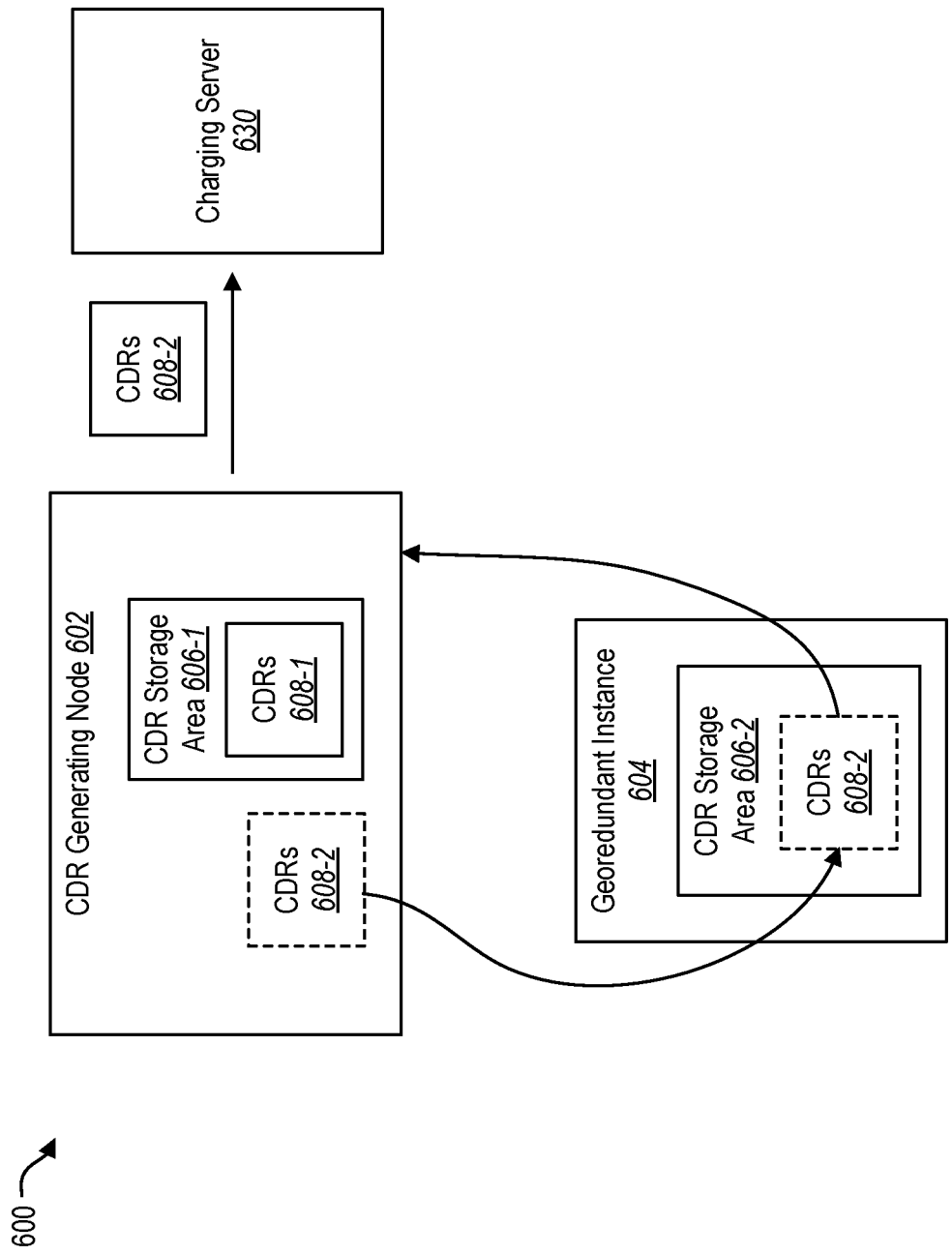
FIG. 6 illustrates an example of a system in which a CDR generating node selects a georedundant instance of the CDR generating node to back up CDRs.

FIG. 6 illustrates an example of a system 600 in which a CDR generating node 602 selects a georedundant instance 604 of the CDR generating node 602 to back up CDRs.

The CDR generating node 602 is similar in many respects to the CDR generating node 102 that was described above in connection with FIGS. 1A-C. The CDR generating node 602 is configured to generate CDRs and to send the CDRs to a charging server 630. When the charging server 630 experiences a failure and becomes temporarily unavailable, the CDR generating node 602 can store at least some of the CDRs that it generates. However, the CDR generating node 602 may not be able to store all of the CDRs that it generates. For example, suppose that a CDR storage area 606-1 of the CDR generating node 602 is large enough to store a first plurality of CDRs 608-1 but not large enough to store a second plurality of CDRs 608-2.

The CDR generating node 602 can, in response to determining that the CDR storage area 606-1 has been saturated or exhausted, cause additional CDRs (such as the second plurality of CDRs 608-2) to be backed up to the georedundant instance 604 of the CDR generating node 602. FIG. 6 shows the CDRs 608-2 being sent to and stored in a CDR storage area 608-2 corresponding to the georedundant instance 604 of the CDR generating node 602.

The georedundant instance 604 of the CDR generating node 602 is not communicatively coupled to the charging server 630. Therefore, in the depicted example, the georedundant instance 604 of the CDR generating node 602 cannot send the CDRs 608-2 to the charging server 630 when the charging server 630 becomes available again. Instead, when the charging server 630 becomes available again, the georedundant instance 604 of the original CDR generating node 602 sends the CDRs 608-2 back to the CDR generating node 602. The CDR generating node 602 then sends the CDRs 608-2 to the charging server 630.

Figure 7:
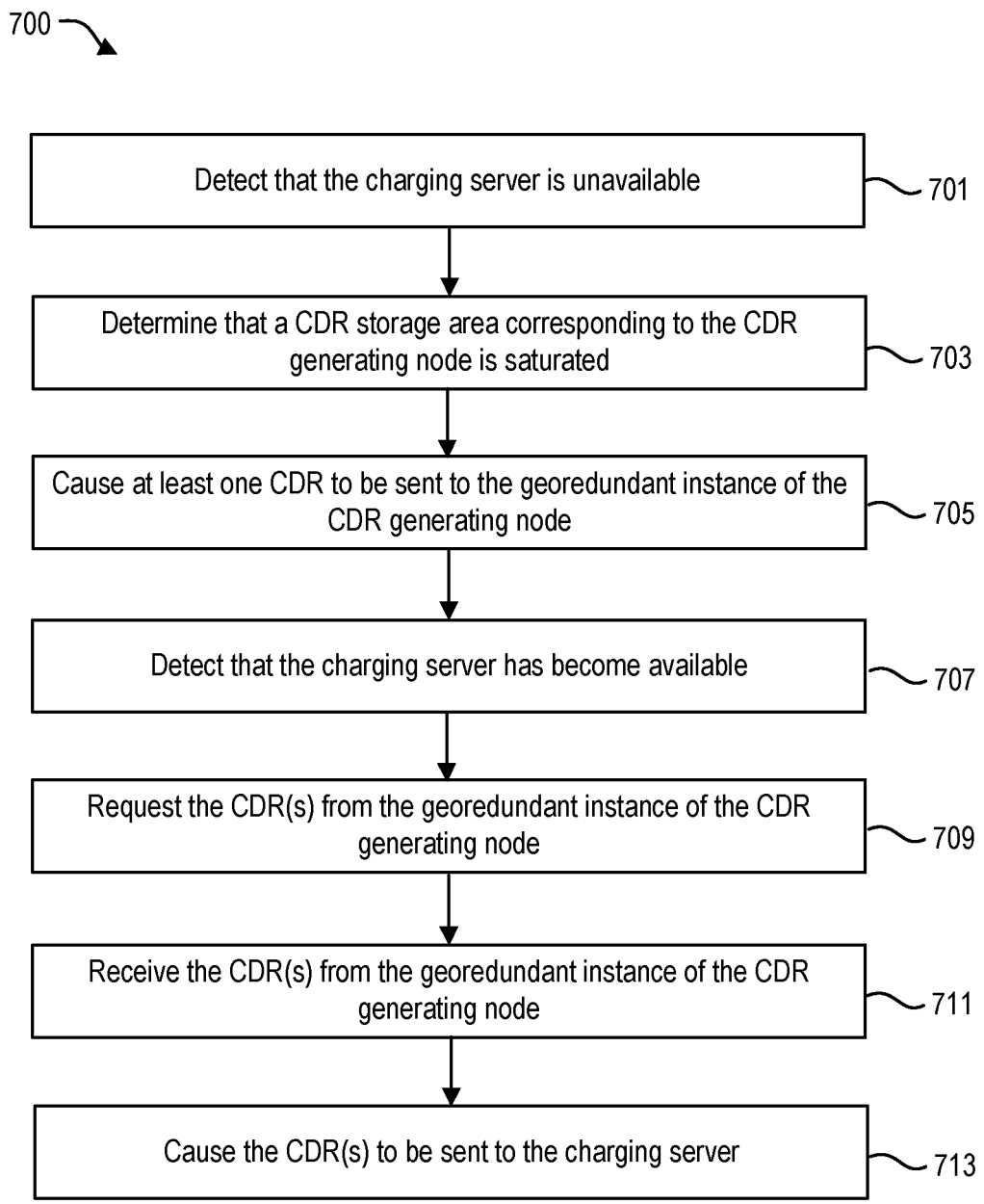
FIG. 7 illustrates an example of a method that can be implemented by the CDR generating node in the system shown in FIG. 6.

FIG. 7 illustrates an example of a method 700 that can be implemented by the CDR generating node 602 in accordance with an embodiment of the present disclosure.

At 701, the CDR generating node 602 can detect that the charging server 630 is unavailable to receive CDRs from the CDR generating node 602. In some embodiments, detecting that the charging server 630 is unavailable can involve sending a message to the charging server 630 and then not receiving an acknowledgement within a pre-defined time period.

At 703, the CDR generating node 602 can determine that a CDR storage area 606-1 corresponding to the CDR generating node 602 is saturated (or exhausted) and should no longer be used to store additional CDRs. In some embodiments, determining that the CDR storage area 606-1 is saturated comprises determining that a usage level of the CDR storage area 606-1 is greater than or equal to a saturation level of the CDR storage area 606-1, as described above.

At 705, the CDR generating node 602 can cause at least one CDR 608-2 to be sent to the georedundant instance 604 of the CDR generating node 602. In some embodiments, causing CDR(s) 608-2 to be sent to the georedundant instance 604 of the CDR generating node 602 can include sending one or more commands or messages to components within the CDR generating node 602 that are responsible for transmitting data to destination(s) that are external to the CDR generating node 602.

At 707, the CDR generating node 602 can detect that the charging server 630 has become available to receive CDRs. In some embodiments, detecting that the charging server 630 has become available to receive CDRs can include receiving one or more communications from the charging server 630.

At 709, the CDR generating node 602 can request that the georedundant instance 604 of the CDR generating node 602 send the CDR(s) 608-2 back to the CDR generating node 602.

At 711, the CDR generating node 602 can receive the CDR(s) 608-2 from the georedundant instance 604 of the CDR generating node 602.

At 713, the CDR generating node 602 can cause the CDR(s) 608-2 to be sent to the charging server 630. In some embodiments, causing CDR(s) 608-2 to be sent to the charging server 630 can include sending one or more commands or messages to components within the CDR generating node 602 that are responsible for transmitting data to destination(s) that are external to the CDR generating node 602.

The Third Generation Partnership Project (3GPP) is a consortium of a number of standards organizations that develop protocols for mobile telecommunications. 3GPP is responsible for the development of Long-Term Evolution (LTE) and related fourth generation (4G) standards, including LTE Advanced and LTE Advanced Pro. 3GPP is also responsible for the development of fifth generation (5G) standards. 5G systems are already being deployed and are expected to become widespread in the near future.

In some embodiments, the techniques disclosed herein can be utilized in a cellular network that is configured in accordance with a 4G standard and/or a 5G standard. In a 4G network, examples of CDR generating nodes include a packet gateway (PGW), a serving gateway (SGW), and a gateway GPRS support node (GGSN) (where "GPRS" stands for General Packet Radio Service). In a 5G network, the functionality of CDR generation is shared between network functions (e.g., a session management function (SMF)) and the charging function (CHF).

As noted above, CDR backup capability messages can take the form of GTP echo request/response messages. In some embodiments, CDR backup capability messages can be sent as echo request/response messages as defined in 3GPP standard TS 29.274.

Section 7.1.1 of TS 29.274 specifies the information elements that are included in an echo request message. One of the information elements in an echo request message is referred to as a private extension. As discussed above in connection with FIG. 1B, a CDR backup capability message 114 can include charging server information 116 and available CDR storage information 118. In some embodiments, the charging server information 116 and available CDR storage information 118 can be included in a private extension information element in an echo request message.

Section 7.1.2 of TS 29.274 specifies the information elements that are included in an echo response message. One of the information elements in an echo response message is referred to as a private extension. As discussed above in connection with FIG. 1B, the first CDR generating node 102 can acknowledge the receipt of a CDR backup capability message 114 by sending an acknowledgement message 120. In some embodiments, the acknowledgement message 120 acknowledging the receipt of a CDR backup capability message 114 can be included in a private extension information element in an echo response message.

In some embodiments, an original CDR generating node can utilize data record transfer request/response messages to send CDRs to a recipient CDR generating node.

Section 6.2.4.5 of TS 32.295 specifies the information elements that are included in a data record transfer request message. One of the information elements in a data record transfer request message is referred to as a data record packet. In some embodiments, CDRs can be included in the data record packet information element in a data record transfer request message that an original CDR generating node sends to a recipient CDR generating node.

In some embodiments, a recipient CDR generating node can acknowledge the receipt of CDRs sent by an original CDR generating node by sending a data record transfer response message. The format of a data record transfer response message is defined in section 6.2.4.6 of TS 32.295.

Figure 8:
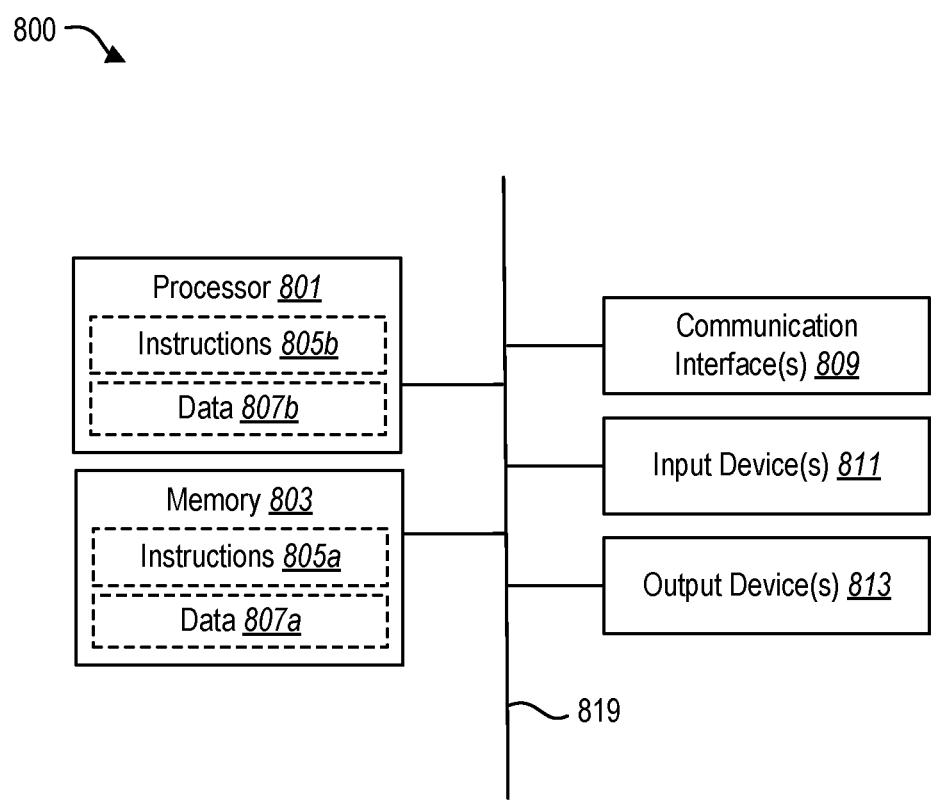
FIG. 8 illustrates certain components that can be included within a computer system that can be used to implement the actions and operations described herein.

FIG. 8 illustrates certain components that can be included within a computer system 800 that can be used to implement the actions and operations described herein. In some embodiments, a plurality of computer systems 800 can collectively implement the actions and operations described herein.

The computer system 800 includes a processor 801 and memory 803 in electronic communication with the processor 801. Instructions 805a and data 807a can be stored in the memory 803. The instructions 805a can be executable by the processor 801 to implement some or all of the methods, steps, operations, actions, or other functionality disclosed herein. Executing the instructions 805a can involve the use of the data 807a that is stored in the memory 803. When the processor 801 executes the instructions 805a, various instructions 805b can be loaded onto the processor 801, and various pieces of data 807b can be loaded onto the processor 801.

Unless otherwise specified, any of the various examples of modules and components described herein can be implemented, partially or wholly, as instructions 805a stored in memory 803 and executed by the processor 801. Any of the various examples of data described herein can be among the data 807a that is stored in memory 803 and used during execution of the instructions 805a by the processor 801.

Although just a single processor 801 and a single memory 803 are shown in the computer system 800 of FIG. 8, in an alternative configuration, a combination of processors and/or a combination of memory devices could be used.

The instructions 805a in the memory 803 can be executable by the processor 801 to perform some or all aspects of the methods that have been described herein. The data 807a stored in the memory 803 can include any of the various examples of data described herein, including any data that is stored, accessed, or otherwise used in connection with the methods that have been described herein.

The computer system 800 can also include various other components, including one or more communication interfaces 809, one or more input devices 811, and one or more output devices 813.

The communication interface(s) 809 can be configured to communicate with other computing systems and/or networking devices. This includes receiving data transmissions from other computing systems and/or networking devices, and also sending data transmissions to other computing systems and/or networking devices. The communication interface(s) 809 can be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The various components of the computer system 800 can be coupled together by one or more buses, which can include a power bus, a control signal bus, a status signal bus, a data bus, etc. For simplicity, the various buses are illustrated in FIG. 8 as a bus system 819.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a cellular network including a plurality of charging data record (CDR) generating nodes and a charging server, a method for distributed backup of unshipped CDRs, the method comprising:
providing, from a recipient CDR generating node of the plurality of CDR generating nodes to an original CDR generating node of the plurality of CDR generating nodes, a CDR capability message, the CDR capability message including:
an indication of a charging server communicatively coupled to the original CDR generating node; and
CDR storage information indicating availability of storage space on a recipient CDR storage area of the recipient CDR generating node;
receiving, at the recipient CDR generating node from the original CDR generating node, a CDR generated by the original CDR generating node based on a determination that the charging server is unavailable and that a usage level of an original CDR storage area of the original CDR generating node is greater than or equal to a saturation level of the original CDR storage area;
storing the CDR on the recipient CDR storage area of the recipient CDR generating node;
determining that the charging server has become available to receive CDRs; and
causing the CDR to be sent to the charging server based on determining that the charging server has become available.

2. The method of claim 1, further comprising causing an acknowledgement message to be sent to the original CDR generating node, the acknowledgement message indicating that the recipient CDR generating node will send CDRs to the charging server when the charging server becomes available again.

3. The method of claim 1, wherein the CDR capability message is a private extension information element in an echo request message generated by the recipient CDR generating node.

4. The method of claim 1, wherein the indication of the charging server indicates a common charging server communicatively coupled to both the original CDR generating node and the recipient CDR generating node.

5. The method of claim 1, wherein the recipient CDR generating node is a georedundant instance of the original CDR generating node that is not communicatively coupled to the charging server.

6. The method of claim 1, wherein the original CDR storage area is a local storage on the original CDR generating node dedicated exclusively to storing CDRs.

7. The method of claim 1, wherein the CDR capability message is an advertisement provided to the original CDR generating node and at least one additional CDR generating node.

8. The method of claim 7, wherein the CDR capability message includes an indication of a second charging server communicatively coupled to the at least one additional CDR generating node, wherein the recipient CDR generating node is communicatively coupled to both the charging server and the second charging server.

9. The method of claim 1, wherein the CDR is provided to the recipient CDR generating node based on:
the CDR storage information indicating a threshold availability of storage on the recipient CDR storage area; and
the recipient CDR generating node having a shortest round trip time associated with communicating the CDR capability message relative to one or more additional CDR generating nodes that communicated one or more additional CDR capability messages to the original CDR generating node.

10. The method of claim 1, wherein the original CDR generating node and the recipient CDR generating node are network functions implemented in a 5G cellular network.

11. A system, comprising:
at least one processor;
memory in electronic communication with the at least one processor; and
instruction stored in the memory, the instructions being executable by the at least one processor to:
provide, from a recipient CDR generating node to an original CDR generating node, a CDR capability message, the CDR capability message including:
an indication of a charging server communicatively coupled to the original CDR generating node; and
CDR storage information indicating availability of storage space on a recipient CDR storage area of the recipient CDR generating node;
receive, at the recipient CDR generating node from the original CDR generating node, a CDR generated by the original CDR generating node based on a determination that the charging server is unavailable and that a usage level of an original CDR storage area of the original CDR generating node is greater than or equal to a saturation level of the original CDR storage area;
store the CDR on the recipient CDR storage area of the recipient CDR generating node;
determine that the charging server has become available to receive CDRs; and
cause the CDR to be sent to the charging server based on determining that the charging server has become available.

12. The system of claim 11, the instructions further being executable by the at least one processor to cause an acknowledgement message to be sent to the original CDR generating node, the acknowledgement message indicating that the recipient CDR generating node will send CDRs to the charging server when the charging server becomes available again.

13. The system of claim 11, wherein the CDR capability message is a private extension information element in an echo request message generated by the recipient CDR generating node.

14. The system of claim 11, wherein the indication of the charging server indicates a common charging server communicatively coupled to both the original CDR generating node and the recipient CDR generating node.

15. The system of claim 11, wherein the recipient CDR generating node is a georedundant instance of the original CDR generating node that is not communicatively coupled to the charging server.

16. The system of claim 11, wherein the original CDR storage area is a local storage on the original CDR generating node dedicated exclusively to storing CDRs.

17. The system of claim 11, wherein the CDR capability message is an advertisement provided to the original CDR generating node and at least one additional CDR generating node, and wherein the CDR capability message includes an indication of a second charging server communicatively coupled to the at least one additional CDR generating node, wherein the recipient CDR generating node is communicatively coupled to both the charging server and the second charging server.

18. In a 5G mobile communication network including a plurality of charging data record (CDR) generating nodes and a charging server, a method for distributed backup of unshipped CDRs, the method comprising:
- providing, from a recipient CDR generating node of the plurality of CDR generating nodes to an original CDR generating node of the plurality of CDR generating nodes, a CDR capability message, the CDR capability message including:
    - an indication of a charging server communicatively coupled to both the original CDR generating node and the recipient CDR generating node; and
    - CDR storage information indicating availability of storage space on a recipient CDR storage area of the recipient CDR generating node;
- receiving, at the recipient CDR generating node from the original CDR generating node, a CDR generated by the original CDR generating node based on a determination that the charging server is unavailable and that a usage level of an original CDR storage area of the original CDR generating node is greater than or equal to a saturation level of the original CDR storage area;
- storing the CDR on the recipient CDR storage area of the recipient CDR generating node;
- determining that the charging server has become available to receive CDRs; and
- causing the CDR to be sent to the charging server based on determining that the charging server has become available.

19. The method of claim 18, further comprising causing an acknowledgement message to be sent to the original CDR generating node, the acknowledgement message indicating that the recipient CDR generating node will send CDRs to the charging server when the charging server becomes available again.

20. The method of claim 18, wherein the CDR capability message is a private extension information element in an echo request message generated by the recipient CDR generating node.

* * * * *